(12) United States Patent
Polak

(10) Patent No.: US 6,814,171 B2
(45) Date of Patent: Nov. 9, 2004

(54) AUTOMOTIVE DRIVE ASSISTANCE SYSTEM AND METHOD

(75) Inventor: Anthony J. Polak, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 83 days.

(21) Appl. No.: 10/231,922

(22) Filed: Aug. 30, 2002

(65) Prior Publication Data

US 2004/0040764 A1 Mar. 4, 2004

(51) Int. Cl.[7] .................................................. B62D 1/00
(52) U.S. Cl. ....................... 180/169; 342/70; 343/711
(58) Field of Search ................................. 180/167, 169, 180/271; 342/70, 71, 72; 343/711, 713

(56) References Cited

U.S. PATENT DOCUMENTS

| | | | | |
|---|---|---|---|---|
| 4,703,240 A | * | 10/1987 | Yoshimoto et al. | 318/587 |
| 4,757,450 A | * | 7/1988 | Etoh | 701/96 |
| 4,902,126 A | * | 2/1990 | Koechner | 356/5.08 |
| 5,214,408 A | * | 5/1993 | Asayama | 340/435 |
| 5,293,955 A | * | 3/1994 | Lee | 180/169 |
| 5,313,262 A | * | 5/1994 | Leonard | 356/4.01 |
| 5,641,963 A | * | 6/1997 | Mueller | 250/342 |
| 5,731,899 A | * | 3/1998 | Meyers | 359/621 |
| 5,949,365 A | * | 9/1999 | Wagner | 342/70 |
| 6,043,772 A | * | 3/2000 | Voigtlaender et al. | 342/70 |
| 6,291,812 B1 | * | 9/2001 | Bechtel et al. | 250/208.1 |
| 6,301,003 B1 | * | 10/2001 | Shirai et al. | 356/4.01 |
| 6,366,245 B1 | | 4/2002 | Schmidt et al. | |
| 6,462,700 B1 | * | 10/2002 | Schmidt et al. | 342/70 |
| 6,626,257 B2 | * | 9/2003 | Kurz et al. | 180/169 |
| 6,647,392 B1 | * | 11/2003 | Tagg | 707/101 |
| 6,657,581 B1 | * | 12/2003 | Lippert et al. | 342/70 |
| 6,657,705 B2 | * | 12/2003 | Sano et al. | 356/4.01 |

FOREIGN PATENT DOCUMENTS

EP  0498524 A2  6/1992

* cited by examiner

Primary Examiner—Christopher P. Ellis
Assistant Examiner—Christopher Bottorff
(74) Attorney, Agent, or Firm—Kevin D. Wills

(57) ABSTRACT

An automotive drive assistance system (100, 200) includes a substrate (215, 221) having a radius of curvature (227, 229), wherein the radius of curvature corresponds to a field of view (226, 228). At least two radiation elements (219, 225) coupled to the substrate, where the at least two radiation elements are coupled to directionally transmit and receive electromagnetic radiation (140, 240) over the field of view. A lens (217, 223) is coupled to focus the electromagnetic radiation transmitted and received from the at least two radiation elements.

3 Claims, 3 Drawing Sheets

200

AUTOMOTIVE DRIVE ASSISTANCE SYSTEM AND METHOD

BACKGROUND OF THE INVENTION

Radar (Radio Ranging and Detection) and Lidar (Light Detection and Ranging) units are starting to be used in automotive applications for driver assistance applications. Typically, these units have a range and field of view to detect objects, such as other automobiles, at an appropriate distance to take any necessary action, such as warning the driver or changing the speed of the automobile. In order to obtain the required field of view, prior art systems use two methods. The first prior art method consists of a mechanical antenna that rotates or oscillates to direct a radar beam over the field of view. The second prior art method involves using a phased array, which consists of several antennas whose relative phase is adjusted to create a radiation pattern of constructive and destructive waves, which forms a beam that can be electronically steered, by adjusting the phases of the individual elements. Both of these prior art methods have disadvantages. The mechanical antenna, although simple in concept, is unreliable in an automotive environment. The phased array radar is generally too expensive for use in an automotive environment.

Accordingly, there is a significant need for an apparatus and method that overcomes the disadvantages of the prior art.

BRIEF DESCRIPTION OF THE DRAWINGS

Referring to the drawing.

Figure 1:
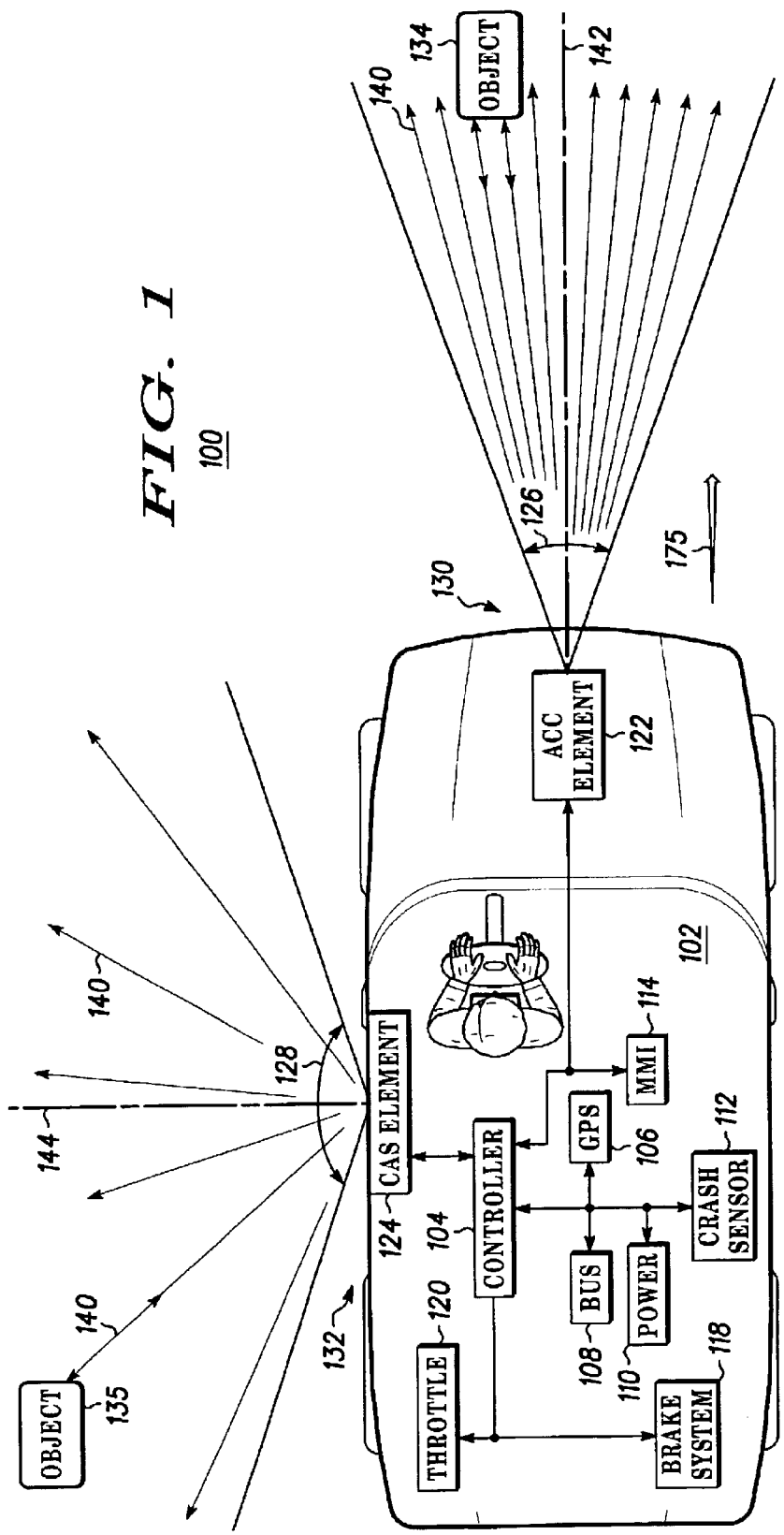
FIG. 1 is a block diagram of an Automotive Drive Assistance System in accordance with an embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings (where like numbers represent like elements), which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical, electrical, or logical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 is a block diagram of an Automotive Drive Assistance System (ADAS) 100 in accordance with an embodiment of the invention. As shown in FIG. 1, ADAS 100 comprises a controller 104 having various input/output (I/O) ports for communicating with various components of an automobile 102. For example, the controller 104 can be coupled to an automobile bus 108, a power supply 110, a man machine interface (MMI) 114, and a crash sensor input 112. The controller 104 is also coupled to various memory elements, such as a random access memory (RAM) or a flash memory (not shown). Controller 104 can also be coupled to a global positioning system (GPS) unit 106 which provides the location of the automobile, as is well known in the art.

In an embodiment, ADAS 100 also includes Adaptive Cruise Control (ACC) element 122 and Collision Avoidance System (CAS) element 124. ACC element 122 operates to emit and receive electromagnetic (EM) radiation 140, generally in the direction of travel 175 of automobile 102, in order to detect an object 134 in front of automobile 102. This can be done using radar or lidar systems as described below, with detection of object 134 signaled to controller 104. CAS element 124 operates to emit and receive EM radation 140 in order to detect an object 135 on the side of automobile 102, for example during lane changes, and the like. This also can be done using radar or lidar systems as described below with detection of object signaled to controller 104. In an embodiment, object 134, 135 can be another automobile, and the like.

In an embodiment of the invention, controller 104 is also coupled to automobile systems, for example, brake system 118, throttle system 120, and the like. This allows controller 104 to manipulate the speed of the automobile 102 in response to inputs from sensors, for example, ACC element 122, CAS element 124, cameras, crash sensor, GPS unit 106, and the like.

In automobile applications, ACC element 122 has a field of view 126 over which it can detect object 134. Any field of view 126 is within the scope of the invention. In a particular embodiment, field of view 126 is approximately 18 degrees, which is approximately 9 degrees each direction from a longitudinal axis 142 of automobile 102. CAS element 124 also has a field of view 128 over which it can detect object 135. Any field of view 128 is within the scope of the invention. In a particular embodiment, field of view 128 is approximately 160 degrees, which is approximately 80 degrees each direction from a latitudinal axis 144 of automobile 102.

In an embodiment of the invention, automobile 102 can be equipped only with ACC element 122, which is a subset of ADAS 100. In this case, ACC element 122, controller 104 and the like can be considered an ACC system 130. In another embodiment, automobile 102 can be equipped only with CAS element 124, which is also a subset of ADAS 100. In this case, CAS element 124, controller 104 and the like can be considered a CAS system 132. In yet another embodiment, automobile 102 can be equipped with both ACC element 122 and CAS element 124. In this case, automobile 102 has both an ACC system 130 and a CAS system 132.

Figure 2:
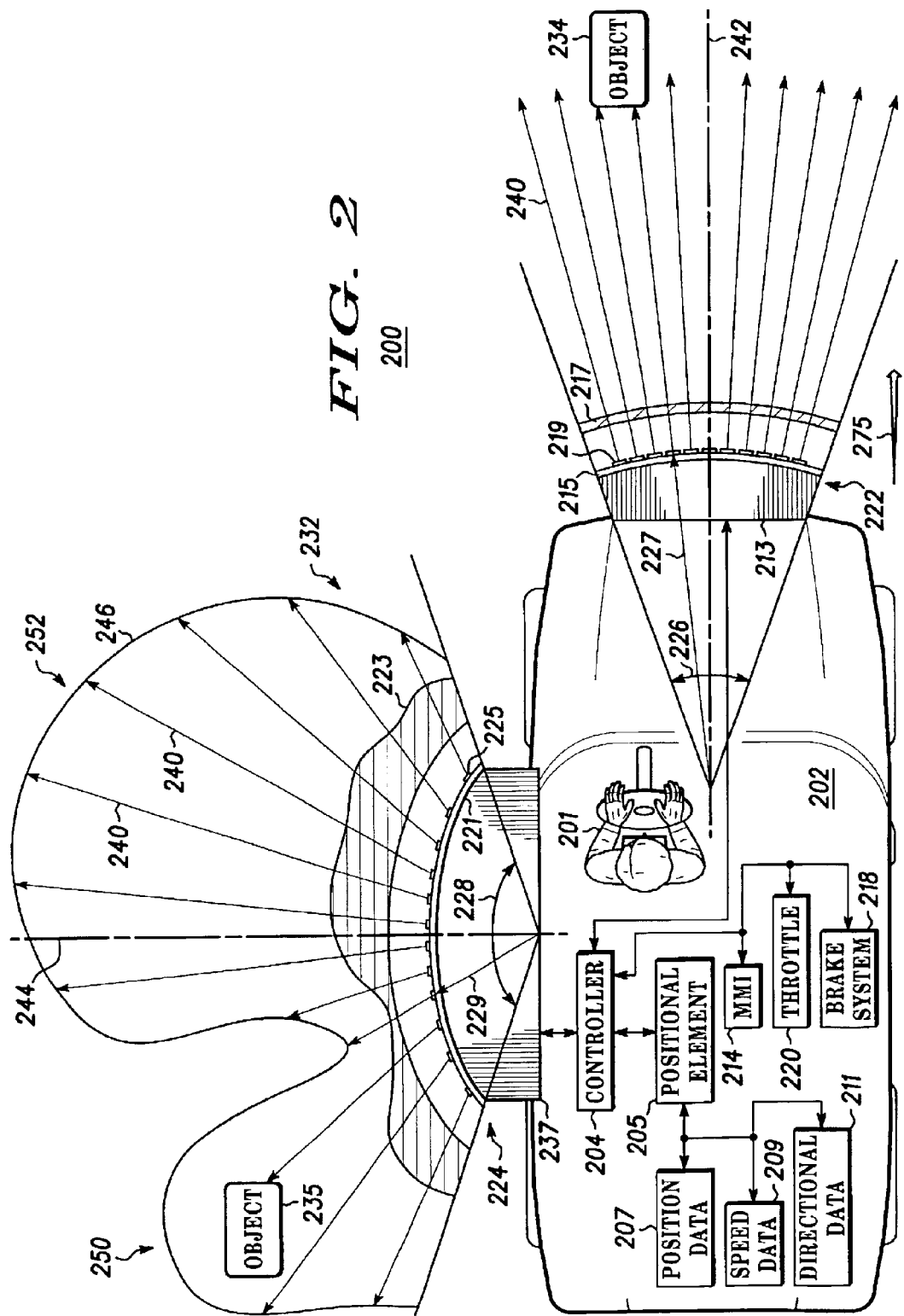
FIG. 2 is a block diagram of an Automotive Drive Assistance System in accordance with another embodiment of the invention.

FIG. 2 is a block diagram of an Automotive Drive Assistance System 200 in accordance with another embodiment of the invention. As shown in FIG. 2, ACC element 222 and CAS element 224 are devices for, directionally emitting and receiving EM radiation 240 in order to detect object 234, 235. EM radiation 240 can be radio frequency radiation, microwave frequency radiation and optical frequency radiation. If radio or microwave EM radiation is being used, this is analogous to conventional radar systems. In this embodiment, transmitted EM radiation 240 can have frequencies around 24 Gigahertz (GHz) or 77 GHz as is typical for automotive type radar systems, and can comprise a succession of identical pulses in each of which the frequency increases linearly with time. By comparing the frequency of the reflected signals off of object 234, 235 with the frequency of the transmitted signals at the time the reflected signals are received, the distance of object 234, 235 from automobile 202 can be determined. Additionally, the velocity of object 234, 235 relative to automobile 202 can be determined from the Doppler shift in frequency. Lidar operates much the same as radar except it uses optical EM radiation, for example and without limitation, optical lasers, and the like, and typically measures the time of flight to obtain the distance to object 234, 235 relative to automobile 202. By repeating this measurement at short time intervals, and measuring the change in distance between each time measurement, the relative velocity of object 234, 235 can be calculated.

ACC element 222 includes a base 213, upon which is formed a substrate 215, which can be quartz, and the like. Substrate 215 has a radius of curvature 227 corresponding to field of view 226. In other words, substrate 215 has a radius of curvature 227 such that radiation elements 219 mounted to substrate 215 radiate EM radiation 240 perpendicular to substrate 215 into field of view 226. Radiation elements 219 are mounted to substrate 215, and designed to directionally transmit and receive EM radiation 240 over field of view 226 generally in the direction of travel 275 of automobile 202. Substrate 215 having radius of curvature 227 has the advantage of allowing radiation elements 219 to cover field of view 226 without the use of mechanical rotation of ACC element 222 or phased array system technology. Radiation elements 219 can be designed to emit and receive EM radiation in the radio or microwave frequency range if ACC element 222 operates as radar. In another embodiment, radiation elements 219 can be designed to emit and receive EM radiation in the optical range if ACC element 222 operates as lidar. In one embodiment, radiation elements 219 can be, for example and without limitation, patch antenna elements manufactured using microstrip technology. In another embodiment, radiation elements can be lasers, and the like.

ACC element 222 also includes lens 217 coupled to focus EM radiation 240 transmitted and received from radiation elements 219. Lens 217 can be a dielectric lens made from solid, transparent, resinous material such as PLEXIGLAS®, a polymer in resin such as TEFLON®, and the like. Radiation elements 219 radiate EM radiation 240 outward (spherically) perpendicular to substrate 215 and lens 217 focuses the individual beams of EM radiation 240 to cover field of view 226. In an embodiment of the invention, ACC element 222 uses two or more radiation elements 219 where each of the radiation elements 219 corresponds to substantially 1 degree of field of view 226. In other words, EM radiation 240 emitted and received from each of radiation elements 219, because of the radius of curvature 227 of substrate 215 and the focusing of lens 217, is directionally emitted in a defined portion of field of view 226. In an embodiment of the invention, where field of view 226 is approximately 18 degrees. there are 18 radiation elements 219, each designed to emit and receive EM radiation in approximately 1 degree of the field of view 226. The invention is not limited to an 18 degree field of view and any size of field of view 226 is within the scope of the invention.

When ACC element 222 detects object 234, for example, another automobile, such detection is relayed to controller 204. Controller 204 then computes a positional element 205 of object 234. Positional element 205 can include position data 207 on object 234, which includes the relative position of object 234 to automobile 202. Positional element 205 can also include speed data 209 on object 234, which can include the relative speed of object 234 to automobile 202. Positional element 205 can also include directional data 211 on object 234, which can include the relative direction of object 234 to automobile 202.

In an embodiment of the invention, once positional element 205 is computed, ADAS 200 can notify a user 201 of automobile 202 of positional element 205. This can be through MMI 214, for example and without limitation, where MMI 214 can include a microphone, speakers, display, and the like. Notification of user 201 can be via audio or visual notifications of the position, speed and/or direction of object 234 relative to automobile 202. In this embodiment, user 201 can then take appropriate action to avoid a collision. In another embodiment, based on positional element 205, automobile 202, using ADAS 200, can alter at least one of direction and velocity to avoid collision with object 234. This can be accomplished by controller 204 operating throttle 220 and/or brake system 218 of automobile 202 either directly or via automobile bus 108.

CAS element 224 includes a base 237, upon which is formed a substrate 221, which can be quartz, and the like. Substrate 221 has a radius of curvature 229 corresponding to field of view 228. In other words, substrate 221 has a radius of curvature 229 such that radiation elements 225 mounted to substrate 221 radiate EM radiation 240 perpendicular to substrate 221 into field of view 228. Radiation elements 225 are mounted to substrate 221, and designed to directionally transmit and receive EM radiation 240 over field of view 228. Substrate 221 having radius of curvature 229 has the advantage of allowing radiation elements 225 to cover field of view 228 without the use of mechanical rotation of CAS element 224 or phased array system technology. Radiation elements 225 can be designed to emit and receive EM radiation in the radio or microwave frequency range if CAS element 224 operates as radar. In another embodiment, radiation elements 225 can be designed to emit and receive EM radiation in the optical range if CAS element 224 operates as lidar. In one embodiment, radiation elements 225 can be, for example and without limitation, patch antenna elements manufactured using microstrip technology. In another embodiment, radiation elements can be lasers, and the like.

CAS element 224 also includes lens 223 coupled to focus EM radiation 240 transmitted and received from radiation elements 225. Lens 223 can be a dielectric lens made from PLEXIGLAS®, TEFLON®, and the like. Radiation elements 225 radiate EM radiation 240 outward (spherically) perpendicular to substrate 221 and lens 223 focuses the individual beams of EM radiation 240 to cover field of view 228. In an embodiment of the invention, CAS element 224 uses two or more radiation elements 225 where each of the radiation elements 225 corresponds to substantially 1 degree of field of view 228. In other words, EM radiation 240 emitted and received from each of radiation elements 225, because of the radius of curvature 229 of substrate 221 and the focusing of lens 223, is directionally emitted in a defined portion of field of view 228. In an embodiment of the invention, where field of view 228 is approximately 160 degrees, there are 160 radiation elements 225, each designed to emit and receive EM radiation in approximately 1 degree of the field of view 228. The invention is not limited to a 160 degree field of view and any size of field of view 228 is within the scope of the invention.

In an embodiment of the invention, lens 223 multi-lobed so as to create a desired radiation pattern 246 for transmitting and receiving EM radiation 240. Multi-lobed lenses are known in the art and are used for generating a directional effect or desired radiation pattern 246. A multi-lobed lens is particularly useful for CAS system 232 where it is desired to direct a portion of EM radiation 240 to a blind spot 250 of automobile and to the lane changing area 252 of automobile. Directing EM radiation 240 to these two areas helps warn user 201 of a potential or impending collision with object 235 while changing lanes.

When CAS element 224 detects object 235, for example, another automobile, such detection is relayed to controller 204. Controller 204 then computes a positional element 205 of object 235. Positional element 205 can include position data 207 on object 235, which includes the relative position of object 235 to automobile 202. Positional element 205 can also include speed data 209 on object 235, which can include the relative speed of object 235 to automobile 202. Positional element 205 can also include directional data 211 on object 235, which can include the relative direction of object 235 to automobile 202.

In an embodiment of the invention, once positional element 205 is computed, ADAS 200 can notify a user 201 of automobile 202 of positional element 205. This can be through MMI 214, for example and without limitation, where MMI 214 can include a microphone, speakers, display, and the like. Notification of user 201 can be via audio or visual notifications of the position, speed and/or direction of object 235 relative to automobile 202. In this embodiment, user 201 can then take appropriate action to avoid a collision. In another embodiment, based on positional element 205, automobile 202, using ADAS 200, can alter at least one of direction and velocity to avoid collision with object 235. This can be accomplished by controller 204 operating throttle 220 and/or brake system 218 of automobile 202 either directly or via automobile bus 108.

Figure 3:
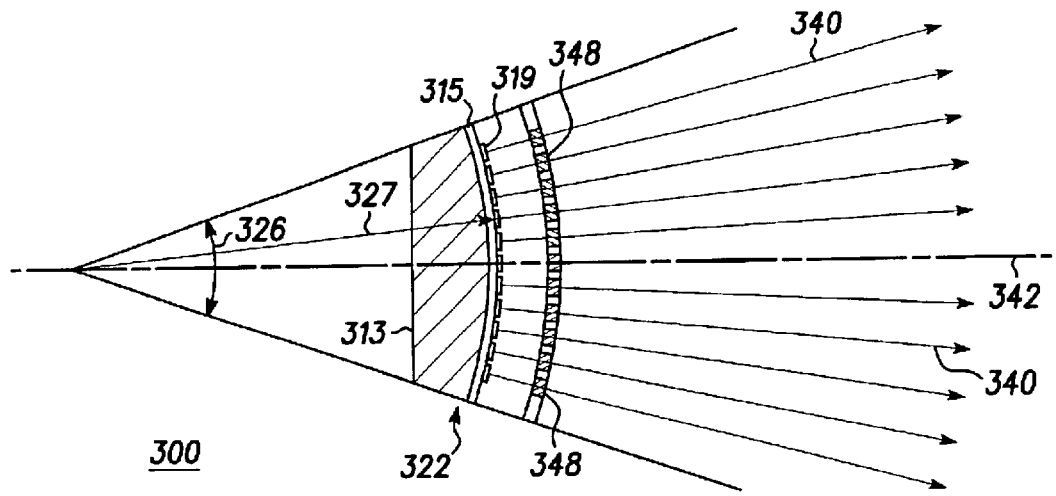
FIG. 3 is a block diagram of an Automotive Drive Assistance System in accordance with still another embodiment of the invention.

While the above embodiments illustrate a monostatic system (i.e. where EM radiation is emitted and received from the same radiation element), it is understood that bistatic systems (i.e. where there are separate radiation elements for transmitting and receiving EM radiation) are within the scope of the invention FIG. 3 is a block diagram of an Automotive Drive Assistance System 300 in accordance with still another embodiment of the invention. As shown in FIG. 3, in an embodiment of the invention, ACC element 222 has a plurality of lenses 348, where each of the plurality of lenses 348 corresponds to each of the radiation elements 319. In other words, each radiation element 319 has it's own lens to focus EM radiation 340. In another, analogous embodiment, CAS element 224 can have a plurality of lenses, where each of the plurality of lenses corresponds to each of the radiation elements.

Figure 4:
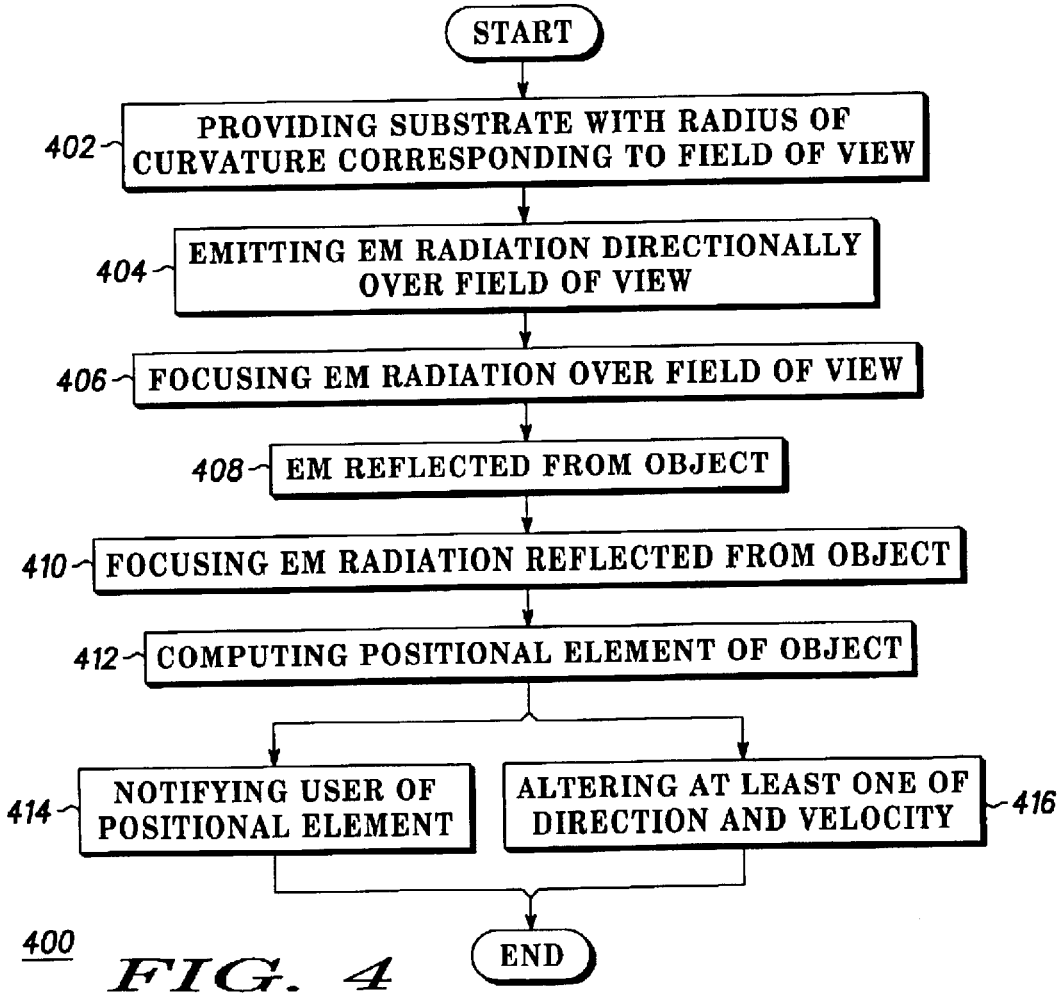
FIG. 4 a flow diagram in accordance with an embodiment of the invention.

FIG. 4 a flow diagram 400 in accordance with an embodiment of the invention. Step 402 includes providing a substrate with a radius of curvature corresponding to a field of view. Step 404 includes at least two radiation elements coupled to the substrate emitting EM radiation directionally over the field of view. In step 406, a lens focuses EM radiation emitted by the at least two radiation elements over the field of view. In another embodiment, lens can be a multi-lobed lens to direct EM radiation to a specific radiation pattern as described above.

In step 408, EM radiation is reflected from an object, for example and without limitation, another automobile. In step 410, the lens focuses EM radiation reflected from the object, back to the corresponding radiation elements. Step 412 includes computing a positional element 205 of the object as described above, where the positional element 205 can include at least one of position data 207, speed data 209 and directional data 211. Subsequent to computation of positional element 205, user 201 can be notified of positional element 205 per step 414 and/or the ADAS can alter at least one of direction and velocity of automobile per step 416.

While we have shown and described specific embodiments of the present invention, further modifications and improvements will occur to those skilled in the art. It is therefore to be understood that appended claims are intended to cover all such modifications and changes as fall within the true spirit and scope of the invention.

What is claimed is:

1. An automotive drive assistance system, comprising:
   a substrate having a radius of curvature, wherein the radius of curvature corresponds to a field of view;
   at least two radiation elements coupled to the substrate, wherein the at least two radiation elements are coupled to directionally transmit and receive electromagnetic radiation over the field of view, wherein each of the at least two radiation elements corresponds to substantially 1 degree of the field of view; and
   a lens coupled to the substrate, wherein the lens is coupled to focus the electromagnetic radiation transmitted and received from the at least two radiation elements.

2. In an automobile, a collision avoidance system, comprising:
   a substrate having a radius of curvature, wherein the radius of curvature corresponds to a field of view;
   at least two radiation elements coupled to the substrate, wherein the at least two radiation elements are coupled to directionally transmit and receive electromagnetic radiation over the field of view, wherein each of the at least two radiation elements corresponds to substantially 1 degree of the field of view; and a lens coupled to the substrate, wherein the lens is coupled to focus the electromagnetic radiation transmitted and received from the at least two radiation elements, wherein the lens is multi-lobed so as to create a desired radiation pattern for transmitting and receiving the electromagnetic radiation.

3. In an automobile, an adaptive cruise control system, comprising:

a substrate having a radius of curvature, wherein the radius of curvature corresponds to a field of view substantially in a direction of travel of the automobile;

at least two radiation elements coupled to the substrate, wherein the at least two radiation elements are coupled to directionally transmit and receive electromagnetic radiation over the field of view, wherein each of the at least two radiation elements corresponds to substantially 1 degree of the field of view; and a lens coupled to the substrate, wherein the lens is coupled to focus the electromagnetic radiation transmitted and received from the at least two radiation elements.

* * * * *